United States Patent
Hasegawa (10) Patent No.: US 8,783,739 B2
(45) Date of Patent: Jul. 22, 2014

(54) LATCH DEVICE AND METHOD OF ASSEMBLING SAME

(71) Applicant: Nihon Plast Co., Ltd., Fujinomiya (JP)

(72) Inventor: Yoshiyuki Hasegawa, Fuji (JP)

(73) Assignee: Nihon Plast Co., Ltd., Shizuoka (JP)

(*) Notice: Subject to any disclaimer, the term of this patent is extended or adjusted under 35 U.S.C. 154(b) by 0 days.

(21) Appl. No.: 13/665,007

(22) Filed: Oct. 31, 2012

(65) Prior Publication Data

US 2013/0106121 A1 May 2, 2013

(30) Foreign Application Priority Data

Oct. 31, 2011 (JP) ................................. 2011-239469

(51) Int. Cl.
*E05C 3/16* (2006.01)
(52) U.S. Cl.
USPC .......................................................... 292/220
(58) Field of Classification Search
USPC ............. 292/95, 96, 121, 122, 126, 194, 219, 292/220, 226, DIG. 11, DIG. 63
See application file for complete search history.

(56) References Cited

U.S. PATENT DOCUMENTS

| | | | | |
|---|---|---|---|---|
| 4,343,501 A * | 8/1982 | Meeks | ........................ | 292/336.3 |
| 5,292,159 A | 3/1994 | Sandhu et al. | | |
| 5,630,630 A | 5/1997 | Price et al. | | |
| 5,975,606 A * | 11/1999 | Forbes et al. | ................ | 296/1.02 |
| 7,052,053 B2 * | 5/2006 | Hall et al. | ...................... | 292/126 |
| 7,617,571 B2 * | 11/2009 | Lee et al. | ......................... | 16/412 |
| 7,644,963 B2 * | 1/2010 | Fan et al. | ......................... | 292/95 |
| 7,823,937 B2 * | 11/2010 | Vitry | .......................... | 292/336.3 |
| 8,245,357 B2 * | 8/2012 | Kajio et al. | ..................... | 16/444 |

FOREIGN PATENT DOCUMENTS

| JP | 2005-043251 A | 2/2005 |
|---|---|---|
| JP | 2007-185992 A | 7/2007 |

OTHER PUBLICATIONS

Combined Search and Examination Report in GB Patent Application No. 1219505.3 dated Mar. 4, 2013.

* cited by examiner

*Primary Examiner* — Kristina Fulton
*Assistant Examiner* — Christine M Mills
(74) *Attorney, Agent, or Firm* — Sughrue Mion, PLLC (57) ABSTRACT

For facilitating the work of applying a pivotal member, which is to be pivotally connected to a base member, with a satisfied biasing force, a coil-shaped torsion spring is mounted on the pivotal member having one end thereof pressed on a projection of the pivotal member, then the pivotal member is moved to the base member in such a manner that the end of the torsion spring is brought into abutment with and pressed against a stopper portion of the base member while releasing from the projection of the pivotal member, and the pivotal member is further moved toward the base member until the pivotal member is properly set to the base member.

10 Claims, 4 Drawing Sheets

LATCH DEVICE AND METHOD OF ASSEMBLING SAME

BACKGROUND OF THE INVENTION

1. Field of the Invention

The present invention relates in general to latch devices and more particularly to the latch devices of a type that includes a base member, a pivotal member that is pivotally connected to the base member to pivot in a latch/release direction and a torsion spring that is mounted on the pivotal member to bias the pivotal member in the latch direction. More specifically, the present invention relates to such latch device and a method of assembling the same.

2. Description of the Related Art

Hitherto, various latch devices of the above-mentioned type have been proposed and put into practical use particularly in the field of motor vehicles. However, some of them are difficult to be assembled due to their inherent construction.

For example, in latch devices for latching a lid to a console box of a motor vehicle, there is a type that includes a base member that is fixed to the lid, a pivotal hook member that is pivotally connected to the base member and selectively engaged with and released from a catch portion of the console box to assume a latch/release position, and a torsion spring that is mounted on the pivotal hook member to bias the pivotal hook member to pivot in the latch direction.

That is, when the lid is rested on the console box while taking a close position, the latch device takes the latch position with the aid of a biasing force produced by the torsion spring. When the pivotal hook member is pivoted in the release direction against the biasing force of the torsion spring, the pivotal hook member is released from the catch portion of the console box. Thus, under this condition, if pulled upward with a certain force, the lid is permitted to pivot upward with ease.

As is understood from the above, the torsion spring in the latch device is arranged to constantly bias the pivotal hook member in the latch direction. That is, in the latch device, the torsion spring is kept stressed or twisted to constantly produce the biasing force.

Thus, for assembling the latch device, a work is needed for applying the torsion spring with a stress or twist. For such work, it has been employed that one end of the torsion spring is pulled out against a biasing force of the spring and hooked to a catch part formed on the base member. However, such work is difficult or at least troublesome because the biasing force produced by the torsion spring during the pulling work of the spring end is not small and thus considerably obstructs the setting work all the time. Actually, due to such difficulty, the assembling work takes a long time.

SUMMARY OF THE INVENTION

For solving the above-mentioned drawbacks, various techniques have been hitherto proposed, some of which are shown in Japanese Laid-open Patent Applications (tokkai) 2007-185992 and 2005-43251.

In the technique disclosed in the publication '992, a torsion spring having a long straight arm at one end thereof is used. The torsion spring is connected to a pivotal member, and the pivotal member is pivotally connected to a base member having an arm holder. That is, after the pivotal member is properly set relative to the base member, the long straight arm of the torsion spring is brought into engagement with the arm holder of the base member through a manual labor of a worker against a biasing force produced by the torsion spring. However, as is mentioned hereinabove, such manual work is difficult and needs a very skilled technique. That is, due to such difficult work, it tends to occur that the long straight arm happens to engage with a wrong position of the arm holder, which suppresses the pivotal member from making a smoothed pivoting movement.

In the technique disclosed in the publication '251, a plurality of holding parts are used for holding a torsion spring. Furthermore, there is employed a tool for temporarily holding a semi-assembled device. However, usage of a plurality of parts results in greater assembly time and thus greater cost.

It is therefore an object of the present invention to provide a latch device and a method of assembling the same, which are free of the above-mentioned drawbacks possessed by conventional technique.

That is, in accordance with the present invention, there are provided a latch device and a method of assembling the same, which facilitate not only the work for mounting a torsion spring on a pivotal member to constitute a spring-installed pivotal member unit but also the work for installing the spring-installed pivotal member unit to a base member while causing the torsion spring to produce a suitable biasing force for biasing the pivotal member to pivot in a given direction.

In accordance with a first aspect of the present invention, there is provided a latch device which comprises a base member adapted to be fixed to a first member which is movable relative to a second member; a pivotal member that is able to pivot relative to the base member when coupled with the base member, the pivotal member being equipped with a hook portion that is engageable with a catch portion provided by the second member; a coil-shaped torsion spring with first and second ends, the torsion spring being mounted on the pivotal member having the first end fixed to the pivotal member and the second end pressed against a projection formed on the pivotal member; and a stopper member provided by the base member, wherein when, for pivotally connecting the pivotal member to the base member, the pivotal member having the coil-shaped torsion spring mounted thereon is moved toward the base member, the second end of the torsion spring becomes in abutment with and pressed against the stopper member while releasing from the projection of the pivotal member thereby to cause, at the time when the pivotal member is properly connected to the base member, the torsion spring to produce a given biasing force with which the pivotal member is biased to pivot in a given direction.

In accordance with a second aspect of the present invention, there is provided a latch device which comprises a knob case adapted to be fixed to a first member which is movable relative to a second member; a knob that is able to pivot relative to the knob case when properly inserted in the knob case, the knob being equipped with a hook portion that is engageable with a catch portion provided by the second member; a coil-shaped torsion spring with first and second ends, the torsion spring being mounted on the knob having the first end fixed to the pivotal member and the second end pressed against a projection formed on the knob; and a stopper wall tightly installed in the knob case, wherein when, for properly inserting the knob into the knob case, the knob having the coil-shaped torsion spring mounted thereon is moved toward the knob case, the second end of the torsion spring becomes in abutment with and pressed against the stopper member while releasing from the projection of the knob thereby to cause, at the time when the knob is properly connected to the knob case, the torsion spring to produce a given biasing force with which the knob is biased to pivot in a given direction.

In accordance with a third aspect of the present invention, there is provided a method of assembling a latch device that includes a base member adapted to be fixed to a first member which is movable relative to a second member, a pivotal member that is able to pivot relative to the base member when coupled with the base member, the pivotal member being equipped with a hook portion that is engageable with a catch portion provided by the second member, a coil-shaped torsion spring with first and second ends, the torsion spring being mounted on the pivotal member having the first end fixed to the pivotal member and the second end pressed against a projection formed on the pivotal member, and a stopper member provided by the base member, wherein when, for pivotally connecting the pivotal member to the base member, the pivotal member having the coil-shaped torsion spring mounted thereon is moved toward the base member, the second end of the torsion spring becomes in abutment with and pressed against the stopper member while releasing from the projection of the pivotal member thereby to cause, at the time when the pivotal member is properly connected to the base member, the torsion spring to produce a given biasing force with which the pivotal member is biased to pivot in a given direction, the method comprising mounting the coil-shape torsion spring on the pivotal member to constitute a pivotal member unit in such a manner that the first end thereof is fixed to the pivotal member and the second end thereof is pressed against the projection of the pivotal member; moving the pivotal member unit toward the base member in such a manner that the second end of the torsion spring is brought into abutment with and pressed against the stopper member of the base member while releasing from the projection of the pivotal member; and continuing the movement of the pivotal member unit until the pivotal member unit is properly set to the base member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

For ease of explanation, the following description uses various directional terms, such as right, left, upper, lower, rightward and the like. It is however to be noted that such terms are to be understood with respect to an operator (viz., driver or passenger) who sits in front of the latch device (or console box) which is to be manipulated by the operator.

For explaining the invention, the following description will be directed to a latch device that is able to latch a lid of a console box arranged in a motor vehicle.

Referring to FIGS. 1 to 6, there is shown a latch device of a first embodiment of the present invention, which is used for latching a lid of a console box in a close position. As will become apparent as the description proceeds, when a knob of the latch device is lifted against a biasing force of a torsion spring, a latched condition of the lid relative to the console box is released and thus the lid is permitted to pivot to an open position if the lid is pulled up with a certain force.

Figure 1:
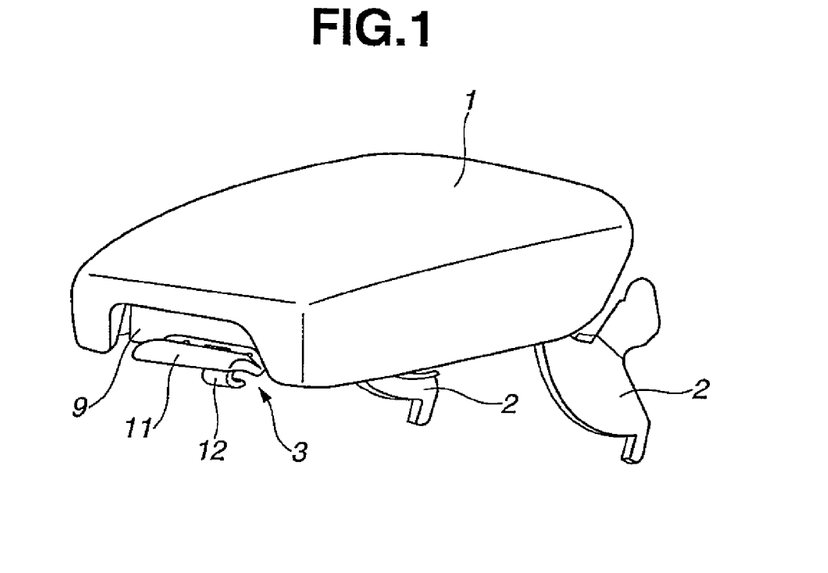
FIG. 1 is a perspective view of a lid for a console box, to which a latch device of a first embodiment of the present invention is practically applied.

Referring to FIG. 1, there is shown a lid 1 that is pivotally connected to a console box (not shown) to cover an open upper part of the console box.

As is seen from the drawing, to a front lower surface of lid 1, there is mounted a latch device 3 which is able to latch lid 1 in a close position. Two brackets 2 and 2 are secured to a back side of lid 1, and, under pivoting of lid 1, brackets 2 and 2 are swung in the console box to smooth the opening/closing pivot movement of lid 1 relative to the open upper part of the console box.

Figure 2:
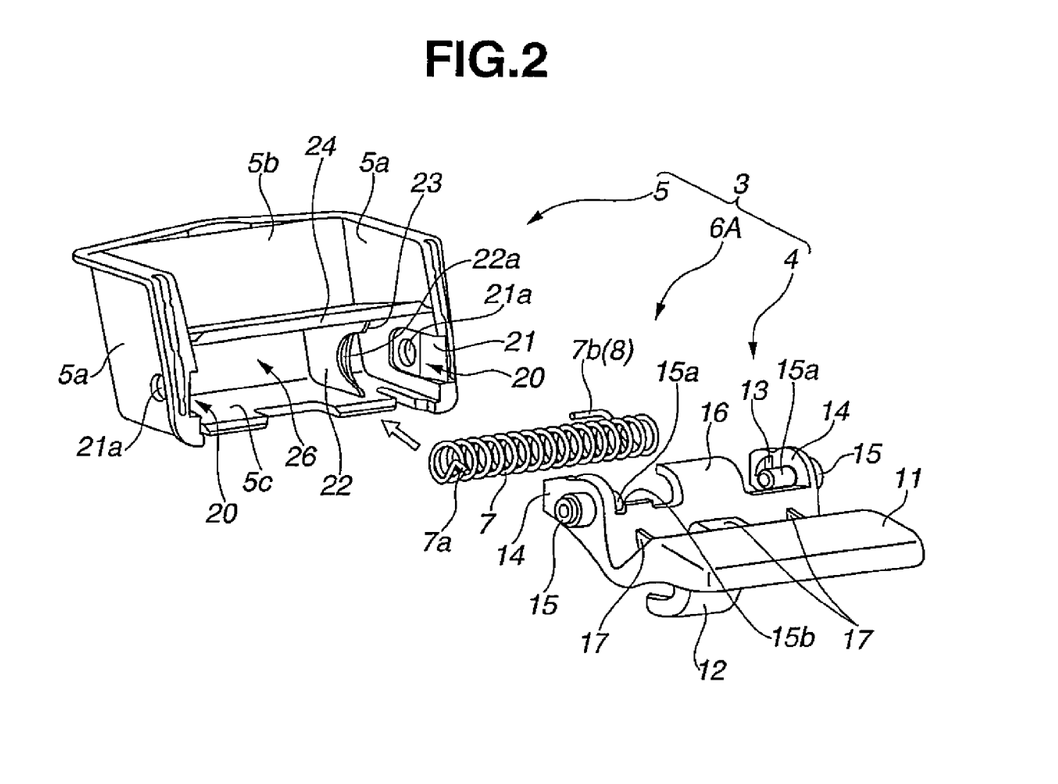
FIG. 2 is an exploded perspective view of the latch device of the first embodiment.

Referring to FIG. 2, there is shown latch device 3 in an exploded manner.

Figure 3:
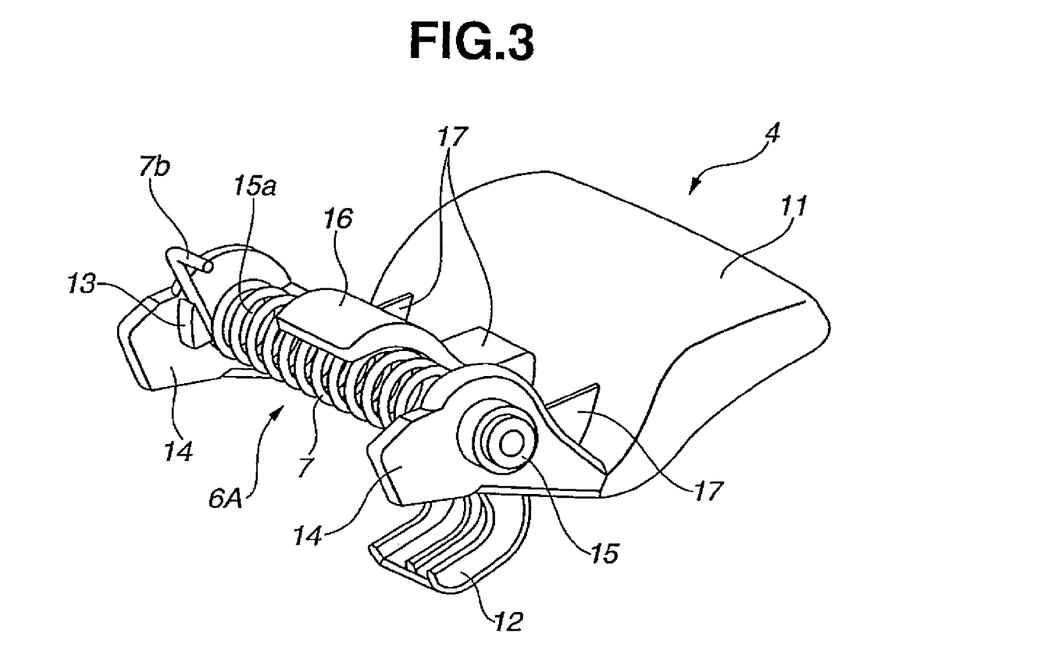
FIG. 3 is an enlarged perspective view of a knob unit used in the latch device of the first embodiment of the invention, the knob unit shown being equipped with a torsion spring.

As shown, latch device 3 generally comprises a pivot knob 4 (or open lever) that is to be manipulated by an operator (not shown), a knob case 5 that is constructed to pivotally support knob 4 and a coil-type torsion spring 6A that is used for biasing knob 4 to pivot in a clockwise direction in FIG. 3, that is, in a latch direction.

As shown, knob case 5 is constructed to have two side walls 5*a* and 5*a*, a rear wall 5*b* and a bottom wall 5*c*.

As will be understood from FIG. 1, a front wall 9 is fixed to front edges of the two side walls 5*a* and 5*a* after an aftermentioned knob unit is properly connected to knob case 5. As will be understood from FIGS. 1 and 2, an upper opening of knob case 5 is closed by a part of lid 1.

As is seen from FIG. 2, two side walls 5*a* and 5*a* of knob case 5 are formed at their inner lower surfaces with guide grooves 20 and 20. As will become apparent as the description proceeds, guide grooves 20 and 20 slidably receive projected ends of aligned stud portions 15 and 15 provided on knob 4.

Each guide groove 20 has a slanted entrance part 21 that inclines laterally outward, and is formed at a deeper part thereof with a circular opening 21*a* for receiving therein the projected end of an associated stud portion 15 as will be explained in detail hereinafter.

In FIG. 2, denoted by numeral 26 is a knob receiving space that is defined in knob case 5 and surrounded by two side walls 5*a* and 5*a*, rear wall 5*b*, bottom wall 5*c* and a horizontal middle wall 24 that extends horizontally between side walls 5*a* and 5*a*. Within knob receiving space 26, there is arranged a holding wall 22 for stably holding torsion spring 6A when knob 4 is properly mounted in knob receiving space 26.

As shown, holding wall 22 extends straightly from a front side of knob case 5 to a rear side of the same. In the illustrated first embodiment, holding wall 22 extends in parallel with side walls 5*a* and 5*a*. Holding wall 22 has a given thickness and has rear, upper and lower sides that are respectively secured to rear wall 5*b*, middle wall 24 and bottom wall 5*c*. With provision of the holding wall 22, mechanical strength of knob case 5 is increased. Furthermore, due to provision of holding wall 22, knob receiving space 26 is divided into left and right chambers, as shown.

As shown in FIG. 2, holding wall 22 is formed at its front edge with a round recess 22*a* for holding a given portion of torsion spring 6A. Furthermore, holding wall 22 is formed at its upper part with a stopper portion 23 against which an after-mentioned bent right end 7b of torsion spring 6A is pressed when knob 4 is led into knob receiving space 26.

Figure 6:
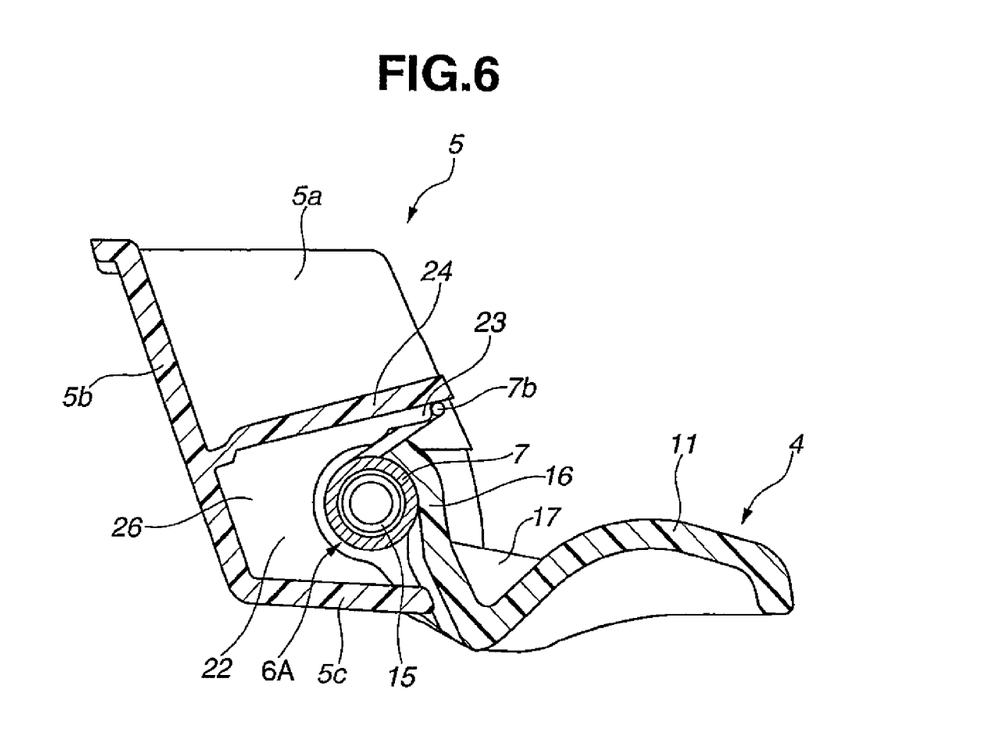
FIG. 6 is a view similar to FIG. 5, but showing a sectional view of a different position.

As will be understood from FIG. 6, when knob 4 is properly installed in knob case 5, the bent right end 7b of torsion spring 6A is kept pressed against stopper portion 23 of holding wall 22 causing torsion spring 6A to keep producing the biasing force. If desired, stopper portion 23 may have a catch portion for assuring the pressed engagement of bent right end 7b with stopper portion 23. Furthermore, if desired, stopper portion 23 may have a small recess for receiving a shank part of bent right end 7b.

As is seen from FIG. 2, torsion spring 6A is of a coil type. That is, torsion spring 6A comprises a coiled main portion 7 with left and right ends 7a and 7b. As shown in FIG. 2, coiled main portion 7 is constructed to advance from left end 7a toward right end 7b while winding clockwise when viewed from an axially outside position of left end 7a.

As will be described in detail hereinafter, left end 7a is fixed to a given portion of knob 4, while bent right end 7b is pressed against a holding projection 13 with a slight biasing force produced by torsion spring 6A.

As is seen from FIG. 2, bent right end 7b is a portion that is bent at right angles toward left end 7a. When knob 4 having torsion spring 6A properly mounted thereon is led into knob receiving space 26 of knob case 5, bent right end 7b of torsion spring 6A, which has been kept pressed against holding projection 13 of knob 4 with a slight biasing force, becomes in contact with and thus pressed against stopper portion 23 of engaging wall 22 while releasing from holding projection 13 thereby causing torsion spring 6A to produce a larger biasing force by which knob 4 is biased to pivot in a given direction (viz., close direction).

If desired, in place of the above-mentioned torsion spring 6A, a double torsion spring may be used. The double torsion spring used is a coil spring that comprises a first coiled portion winding in one direction and a second coiled portion winding in the other direction which are connected in series. An axially middle portion of the double torsion spring is stably fixed to knob 4, and respective outside ends of the double torsion spring are pressed against projections formed on knob 4 with small biasing forces. When knob 4 is led into knob receiving space 26 of knob case 5, the respective outside ends of the double torsion spring are newly pressed against stopper portions of two engaging walls tightly installed in knob receiving space 26 while releasing from the projections of knob 4. With this, a biasing force for biasing knob 4 to pivot in the given direction is produced by and stored in the double torsion spring.

If desired, the outside ends of the double torsion spring may be stably fixed to knob 4 and the axially middle portion of the spring may be put on a projection of knob 4 with a small biasing force. In this case, when knob 4 is led into knob receiving space 26 of knob case 5, the axially middle portion of the spring is newly pressed against a stopper portion of an engaging wall tightly installed in knob receiving space 26 while releasing from the projection of knob 4. Also in this case, a biasing force for biasing knob 4 to pivot in the given direction is produced by and stored in the double torsion spring.

Referring back to FIG. 2, knob 4 comprises a handle portion 11 that is to be grasped by an operator and a hook portion 12 that is to be engaged with a catch portion (not shown) formed on the console box. That is, when knob 4 takes a latch or rest position, hook portion 12 is in engagement with the catch portion of the console box. Under this condition, lid 1 is latched to the console box. As will be understood as the description proceeds, torsion spring 6A functions to bias hook portion 12 to move toward the catch portion.

As is seen from FIGS. 2 and 3, knob 4 further comprises a pair of torsion spring holding portions 15a and 15a that are axially spaced from each other to hold therebetween torsion spring 6A, a small recess 15b that stably receive or hold left end 7a of the spring 6A and holding projection 13 that temporarily holds the bent right end 7b of torsion spring 6A while slightly twisting torsion spring 6A in a direction to produce a small biasing force.

It is to be noted that the small biasing force produced by torsion spring 6A is smaller than a certain biasing force against which an operator manipulates or handles knob 4 for the purpose of unlatching the lid 1. Of course, the small biasing force is set to such a degree as to suppress bent right end 7b from coming off holding projection 13.

When, as is shown in FIG. 3, torsion spring 6A is properly held by torsion spring holding portions 15a and 15a of knob 4 having bent right end 7b pressed against holding projection 13 with small biasing force, bent right end 7b takes a posture to project radially outward in a direction perpendicular to a direction in which knob 4 is moved into knob receiving space 26 of knob case 5. It is to be noted that the size and position of bent right end 7b of torsion spring 6A are suitably adjusted in accordance with those of stopper portion 23 of holding wall 22.

As is seen from FIG. 2, torsion spring holding portions 15a and 15a are incorporated with right and left flange portions 14 and 14 formed on knob 4. For the purpose that will become apparent hereinafter, right and left flange portions 14 and 14 are made resiliently flexible.

Holding projection 13 is formed on an inner surface of the right flange portion 14 as shown. Projected ends of aligned stud portions 15 and 15 are provided at outer surfaces of the right and left flange portions 14 and 14, as shown.

In the illustrated embodiment, the aligned stud portions 15 and 15 are in alignment with torsion spring holding portions 15a and 15a. However, if desired, the stud portions 15 and 15 and torsion spring holding portions 15a and 15a may be so arranged that respective axes thereof extend in parallel with each other.

As is seen from FIGS. 2 and 3, knob 4 is formed at a middle portion thereof with a curved holder 16 for suppressing displacement of torsion spring 6A from its right position. Usually, curved holder 16 is kept spaced from torsion spring 6A. As shown, knob 4 is formed with a plurality of reinforcing ribs 17.

In the following, the work for assembling the latch device 3 will be described in detail with reference the drawings, particularly FIG. 4.

Figure 4:
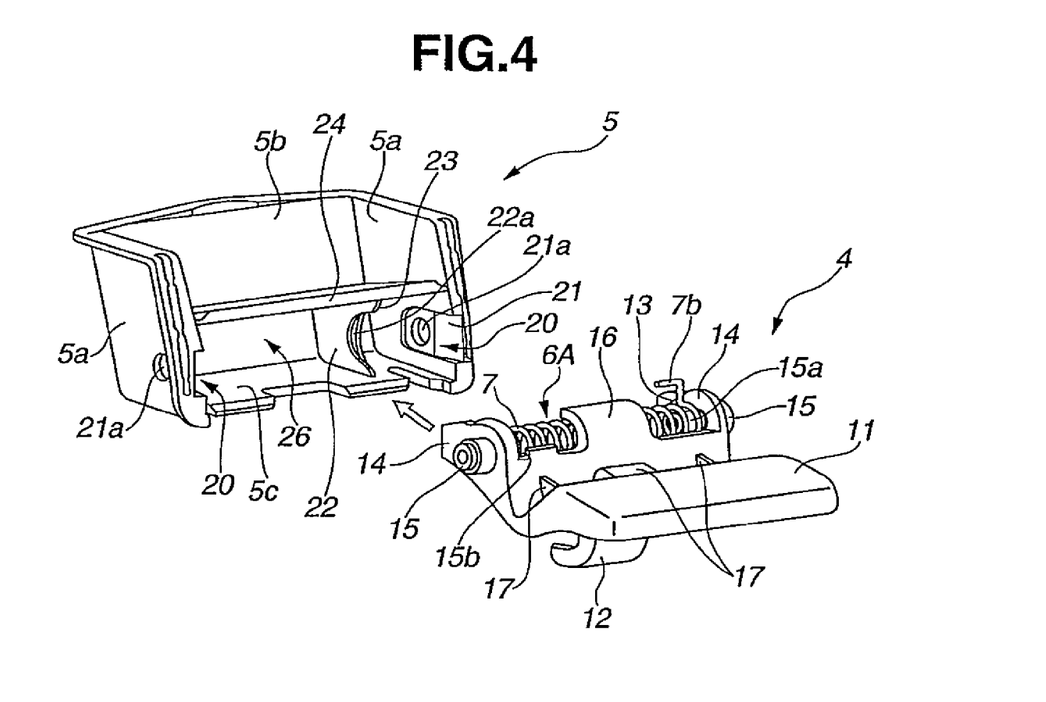
FIG. 4 is a view similar to FIG. 2, but showing a condition in which the knob unit is about to be led into a knob case.

First, as is seen from FIG. 4, torsion spring 6A is properly mounted on knob 4 in the above-mentioned manner. Under this condition, left end 7a of torsion spring 6A is fixed to a given portion of knob 4 and bent right end 7b of the spring 6A is put on and pressed against holding projection 13 of knob 4 with a small biasing force. That is, torsion spring 6A is stably held by knob 4 to constitute a knob unit.

Then, as is indicated by an arrow in the drawing, the knob unit, which is the knob 4 having torsion spring 6A properly mounted thereon, is pushed or inserted into knob receiving space 26 of knob case 5.

Due to the resilient flexibility of right and left flange portions 14 and 14 of knob 4, such insertion is permitted.

During the insertion, projected ends of aligned stud portions 15 and 15 of knob 4 are slid in and guided by guide grooves 20 and 20 of the two side walls 5a and 5a of knob case 5. Due to provision of slanted entrance portions 21, insertion of the stud portions 15 and 15 into the guide grooves 20 and 20 is smoothly carried out.

When insertion of the knob unit into knob receiving space 26 is made by a given distance, bent right end 7b of torsion spring 6A, which has been kept pressed against holding projection 13 with a small biasing force, is brought into contact with stopper portion 23 of holding wall 22 of knob case 5.

Thus, when insertion of knob unit is continued, bent right end 7b is pressed by stopper portion 23 toward the entrance of knob receiving space 26 while leaving from holding portion 13. Due to flexing of bent right end 7b toward the entrance, that is, in a direction to wind up torsion spring 6A, the biasing force produced by the spring 6A is gradually increased.

Figure 5:
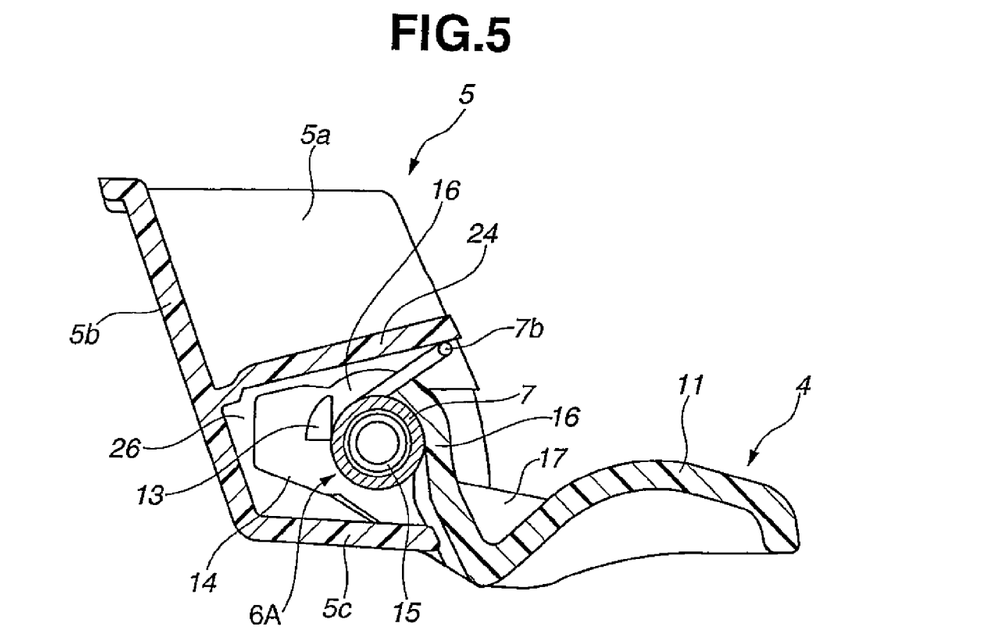
FIG. 5 is an enlarged sectional view of one position of the latch device of the first embodiment.

When the knob unit is finally moved to a right set position, projected ends of aligned stud portions 15 and 15 are sled into circular openings 21a and 21a of right and left side walls 5a and 5a of knob case 5, and thus, under this condition, the knob unit is stably and pivotally held by knob case 5 while being biased to pivot in clockwise direction in FIG. 4 and FIG. 5, that is, in a direction to bias the knob unit to pivot in the latch direction.

Then, knob case 5 is fixed to the lower surface of the lid 1 in a known manner. Of course, fixing knob case 5 to the lid 1 is so made that when knob 4 takes the latch position, hook portion 12 of knob 4 is assuredly caught by the catch portion provided by the console box.

FIGS. 5 and 6 respectively show enlarged sectional views of the knob unit at two different positions. That is, FIG. 5 is a sectional view taken along an imaginary plane that faces holding projection 13 formed on right flange portion 14, and FIG. 6 is a sectional view taken along an imaginary plane that faces holding wall 22 of knob case 5.

As will be understood from FIG. 6, when pressed against stopper portion 23 of knob case 5, bent right end 7b of torsion spring 6A is assuredly positioned, and as will be understood from FIG. 5, upon engagement of bent right end 7b with stopper portion 23, bent right end 7b is pressed also against a lower surface of middle wall 24 of knob case 5.

As is mentioned hereinabove, when the knob unit is led into knob receiving space 26 of knob case 5, bent right end 7b of torsion spring 6A, which has been pressed on holding projection 13 of right flange portion 14 with a small biasing force, is pushed back by stopper portion 23 of knob case 5 while releasing from the holding projection 13. Thus, thereafter, the biasing force produced by torsion spring 6A is gradually increased until the knob unit is led into the proper set position where aligned stud portions 15 and 15 are received in circular openings 21a and 21a of right and left side walls 5a and 5a of knob case 5. Thus, once knob 4 is properly set in knob case 5, knob 4 can be kept stably and pivotally held in knob case 5 while being biased to pivot in a latch direction with a large biasing force.

Due to the larger biasing force of torsion spring 6A, hook potion 12 of knob 4 is kept engaged with the catch portion provided by the console box.

It is to be noted that when knob 4 (or knob unit) is pivoted against the larger biasing force of torsion spring 6A, hook portion 12 of knob 4 becomes released from the catch portion of the console box. Upon this, lid 1 (see FIG. 1) becomes unlatched from the console box (not shown) and thus, lid 1 can be pivoted upward from the console box if lid 1 is pulled upward with a certain force.

As is described hereinabove, in the present invention, the following steps are used for assembling the latch device 3.

At first, torsion spring 6A is properly mounted on knob 4 having the bent end 7b of torsion spring 6A pressed against the holding projection 13 of the flange portion 14. With this, a knob unit including knob 4 and torsion spring 6A is produced. Since a certain biasing force is produced and kept by torsion spring 6A, torsion spring 6A is stably held by knob 4.

Then, the knob unit is inserted into knob receiving space 26 of knob case 5 in the above-mentioned manner. During this insertion, the bent right end 7b of torsion spring 6A is pressed back by stopper portion 23 of knob case 5, and thus, the biasing force of torsion spring 6A is gradually increased with insertion of knob unit into knob case 5.

Thus, when knob unit is finally sled to the proper set position in knob case 5, the biasing force produced by torsion spring 6A exhibits the maximum value and the maximum biasing force is kept as long as the knob unit takes the proper set position in knob case 5.

As will be understood from the above description, in the present invention, once torsion spring 6A is mounted on knob 4 having one end 7b put on holding projection 13, a subsequent work for inserting the knob unit (viz., unit including knob 4 and torsion spring 6A) into knob case 5 brings about two achievements at the same time, one being to provide the knob unit with a given biasing force, and the other being to set the knob unit at a proper position in knob case 5.

It is to be noted that providing torsion spring 6A with the maximum (or suitable) biasing force by just inserting the knob unit into a given position of knob case 5 like in case of the present invention can be easily made. While, if the work for providing torsion spring 6A with the maximum (or suitable) biasing force is made by pulling bent end 7b of the spring 6A by an operator's fingers, he or she has to have a quite skilled assembling technique. Furthermore, such work is quite difficult and thus, it may happen that torsion spring 6A shoots out like a bullet if he or she fails to properly fix or mount torsion spring 6A to knob 4.

During insertion of the knob unit into knob case 5, a major part (see FIG. 2) of holding wall 22 suppresses the bent end 7b of torsion spring 6A from engaging with an improper position.

Figure 7:
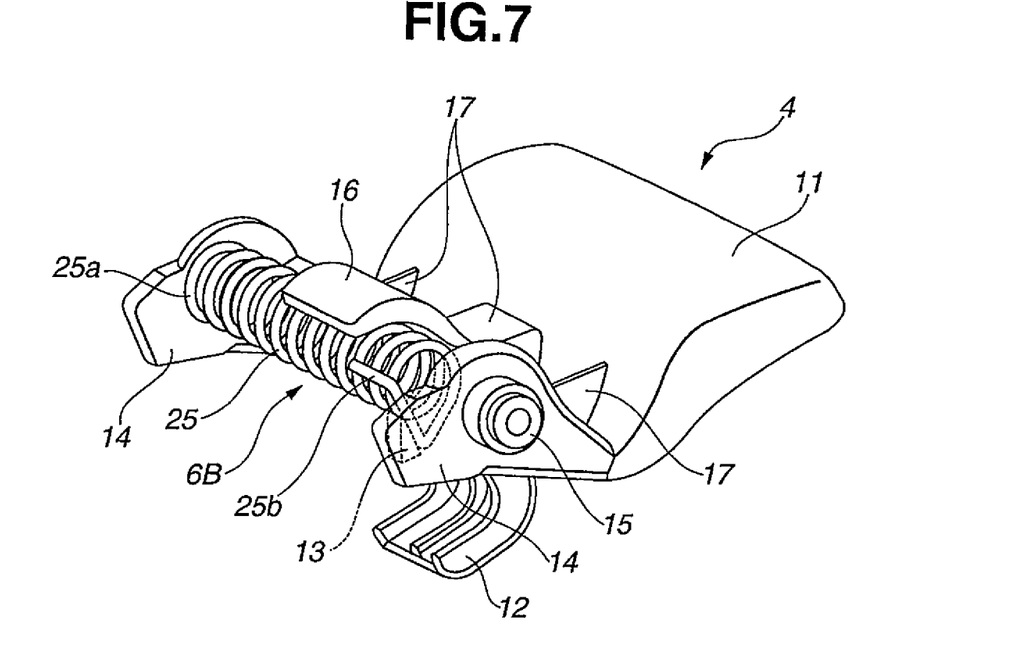
FIG. 7 is a view similar to FIG. 3, but showing a knob unit employed in a latch device of a second embodiment of the present invention.

Referring to FIG. 7, there is shown a knob unit used in a second embodiment of the present invention.

As is understood from this drawing, in this second embodiment, a different torsion spring 6B is used, which comprises a coiled main portion 25 with right and left ends 25a and 25b. As shown, coiled main portion 25 is constructed to advance from right end 25a toward left end 25b while winding counterclockwise when viewed from an axially outside position of right end 25a. That is, the winding direction of torsion spring 6B is opposite to that of the above-mentioned torsion spring 6A used in the first embodiment.

As is seen from the drawing, right end 25a of torsion spring 6B is fixed or fitted to a projected portion (not shown) formed on right flange portion 14 of knob 4. Left end 25b of torsion spring 6B is bent axially inward at right angles to constitute a bent left end 25b.

Although not shown in FIG. 7, in the second embodiment, a knob case similar to knob case 5 shown in FIG. 2 is used.

However, the knob case used in this second embodiment is somewhat different from the above-mentioned knob case 5 of the first embodiment.

That is, in the knob case of the second embodiment, an holding wall corresponding to holding wall 22 (see FIG. 4) is placed at a left side of the knob receiving space 26. That is, when the knob unit is led into the knob receiving space of the knob case, bent left end 25b of torsion spring 6B is pressed back by the stopper portion provided on the holding wall, like in the case of the first embodiment.

Figure 8:
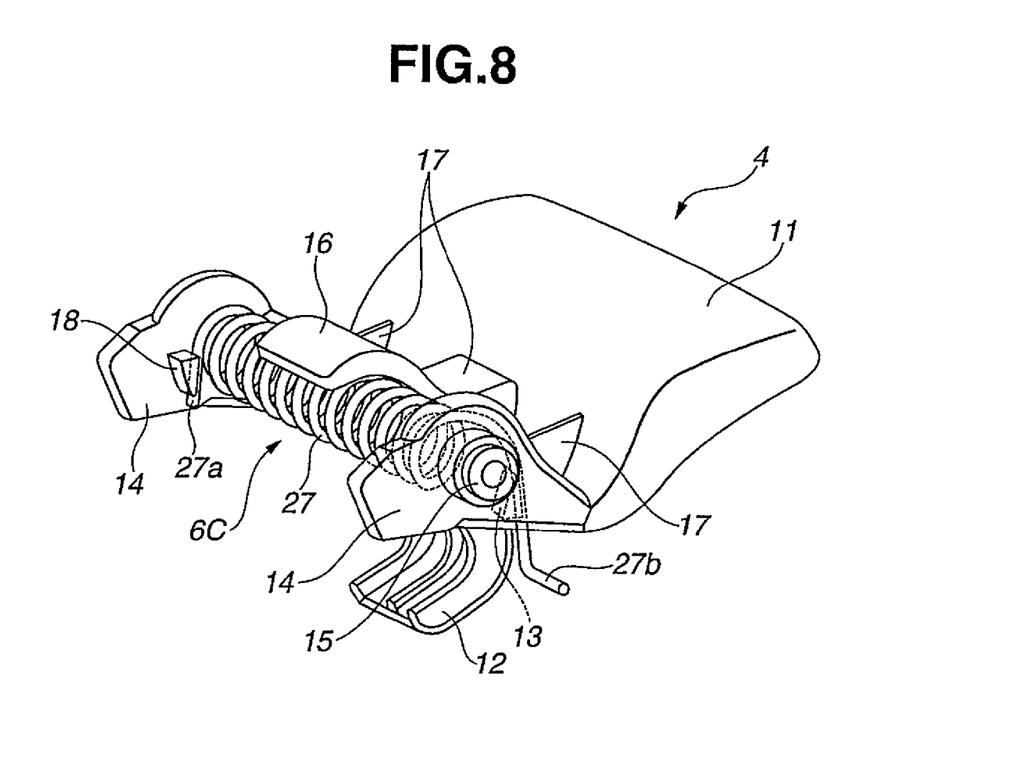
FIG. 8 is a view similar to FIG. 7, but showing a knob unit employed in a latch device of a third embodiment of the present invention.

Referring to FIG. 8, there is shown a knob unit used in a third embodiment of the present invention.

As is understood from this drawing, in this third embodiment, a torsion spring 6C is used, which is different from the above-mentioned two torsion springs 6A and 6B and comprises a coiled main portion 27 with right and left ends 27a and 27b. As shown, coiled main portion 27 is constructed to advance from right end 27a toward left end 27b while winding counterclockwise when viewed from an axially outside position of right end 27a.

As is seen from the drawing, right end 27a of torsion spring 6C is fitted to a projection 18 provided by right flange portion 14 of knob 4. Left end 27b of torsion spring 6C is bent axially outward at right angles to constitute a bent left end 27b.

It is to be noted that bent left end 27b of torsion spring 6C is directed downward or placed at a lower position. This means that, as will become apparent hereinafter, storing the biasing force in torsion spring 6C is made by flexing bent left end 27b rightward in FIG. 8, that is, in a direction to increase the diameter of torsion spring 6C. While, in the above-mentioned first and second embodiments, storing the biasing force in torsion spring 6A or 6B is made by flexing bent right or left end 7b or 25b in a direction to decrease the diameter of torsion spring 6A or 6B.

Although not shown in FIG. 8, in this third embodiment, a knob case similar to knob case 5 shown in FIG. 2 is used.

However, the knob case used in this third embodiment is somewhat different from the above-mentioned knob case 5 of the first embodiment.

That is, in the knob case of the third embodiment, an holding wall corresponding to holding wall 22 (see FIG. 4) is placed at a left side of the knob receiving space 26, and a stopper portion corresponding to stopper portion 23 is provided by a lower portion of the holding wall.

When the knob unit is led into the knob receiving space of the knob case, bent left end 27b of torsion spring 6C is pressed back by the stopper portion provided on the holding wall. With this, bent left end 27b is flexed rightward in FIG. 8 while increasing the diameter of coiled main portion 27 of torsion spring 6C storing a biasing force. When the knob unit is finally set in the knob case in the above-mentioned manner, the knob unit is stably and pivotally held by the knob case while being biased to pivot in the latch direction.

In the following, various advantages possessed by the present invention will be itemized.

In a conventional technique, to cause a torsion spring to produce a desired biasing force used for biasing a pivotal member (or knob) in a given direction relative to a fixed base member (or knob case), it is necessary for an operator to pull one end of the torsion spring and bring the end to a given position by his or her hand or hands awkwardly. While, in the present invention, once the torsion spring 6A, 6B or 6C is temporarily mounted on knob 4 to constitute a knob unit, the subsequent work for setting the knob unit in the knob case 5 can be easily made establishing storage of a sufficient biasing force of the torsion spring 6A, 6B or 6C which is used for biasing knob 4 to pivot in the given direction.

In the invention, storing the biasing force of torsion spring 6A, 6B or 6C is made by flexing one end of the torsion spring in a direction to decrease or increase the diameter of the coiled main portion of the torsion spring. This is advantageous when it is intended to install the knob unit in a limited space of the knob case 5.

In the invention, the work that requires a certain worker's technique is to put one bent end of torsion spring 6A, 6B or 6C to holding projection 13 of knob 4. However, such work can be easily made by the worker because putting the bent end of the torsion spring to the holding projection produces only a small biasing force.

The end 7b, 25b or 27b of torsion spring 6A, 6B or 6C that is to abut against the stopper portion 23 of knob case 5 is bent axially inward or outward at right angles to constitute the bent end 7b, 25b or 27b. This increases a reliability with which the bent end abuts against the stopper portion 23.

Once the knob unit is inserted to a position of knob case 5 where the bent end 7b, 25b or 27b contacts the stopper portion 23 of knob case 5, subsequent insertion of the knob unit into knob case 5 causes torsion spring 6A, 6B or 6C to produce a desired larger biasing force that is suitable for biasing knob 4 to pivot in the given direction at the time when the latch device 3 is finally assembled. Such subsequent insertion of the knob unit into the knob case can be made with ease.

In the invention, a stable mounting of torsion spring 6A, 6B or 6C on knob 4 is carried out with the aid of a slight biasing force produced by the torsion spring. Due to the biasing force received by knob 4 through both ends of the spring 6A, 6B or 6C, torsion spring 6A, 6B or 6C is stably held by knob 4 while being kept biased.

If desired, holding wall 22 of knob case 5 may have a recess for receiving part of bent end 7b, 25b or 27b. With this, the engagement of bent end 7b, 25b or 27b with stopper portion 23 of knob case 5 is much assuredly made when the knob unit is led into a right position in knob case 5.

The entire contents of Japanese Patent Application 2011-239469 filed Oct. 31, 2011 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A latch device comprising:
   a base member adapted to be fixed to a first member which is movable relative to a second member said base member having at least a back wall and two opposed side walls, each of said side walls having a guide groove, said guide grooves defining two parallel tracks and an insertion direction;
   a pivotal member that is able to pivot about an axis of rotation that is orthogonal to said insertion direction and relative to the base member when coupled with the base member, the pivotal member having opposed stud portions, each stud portion positioned and sized to travel in said insertion direction so that said pivotal member is moveable between at least first and second positions along a respective one of said tracks, the pivotal member also being equipped with a hook portion that is engageable with a catch portion provided by the second member when at said second position;
   a coil-shaped torsion spring with first and second ends, the torsion spring being mounted on the pivotal member in a direction transverse to said insertion direction and having the first end fixed to the pivotal member and the second end pressed against a projection formed on the pivotal member when the pivotal member is at said first position; and
   a stopper member provided by the base member,
   wherein, when the pivotal member, having the coil-shaped torsion spring mounted thereon and being connected to the base member by having said stud portions inserted in said guide grooves, is at said second position, the second end of the torsion spring is in abutment with and pressed against the stopper member and is released from the projection of the pivotal member, and the pivotal member in a latchable condition, and whereby, at the time when the pivotal member is connected to the base member at said second position, the torsion spring produces a given biasing force with which the pivotal member is biased to pivot in a given direction.

2. A latch device comprising:

a knob case adapted to be fixed to a first member which is movable relative to a second member, said knob case having at least a pair of guide grooves, said guide grooves defining two parallel tracks and an insertion direction;

a manually operable knob that is able to pivot about an axis of rotation that is orthogonal to said insertion direction and relative to the knob case when properly inserted in the knob case, the knob having opposed projected portions, each projected portion positioned and sized to travel in said insertion direction so that said knob is moveable between at least first and second positions along a respective one of said tracks, the knob being equipped with a hook portion that is engageable with a catch portion provided by the second member when at said second position;

a coil-shaped torsion spring with first and second ends, the torsion spring being mounted on the knob in a direction transverse to said insertion direction and having the first end fixed to the knob and the second end pressed against a projection formed on the knob; and a stopper member tightly installed in the knob case, wherein when the knob having the coil-shaped torsion spring mounted thereon and being connected to the knob case by having said stud portions inserted in said guide grooves, is at said second position, the second end of the torsion spring is in abutment with and pressed against the stopper member and is released from the projection of the knob, whereby, at the time when the knob is connected to the knob case at said second position, the torsion spring produces a given biasing force with which the knob is biased to pivot in a given direction.

3. The latch device as claimed in claim 2, in which the second end of the torsion spring is bent to extend in a direction parallel with the axis of the torsion spring thereby to assure the abutment of the second end with the stopper member.

4. The latch device as claimed in claim 2, in which the stopper member is formed with a recess into which a part of the second end of the torsion spring is received.

5. The latch device as claimed in claim 2, in which the stopper member is arranged to extend in said insertion direction, a direction in which the knob is moved at the time of inserting the knob into the knob case.

6. The latch device as claimed in claim 2, in which the guide grooves provide the tracks in and along which the projected portions of the knob are slidable.

7. The latch device as claimed in claim 6, in which the projected portions are formed on outer walls of two flange portions provided by the knob, and in which the torsion spring is compressed between the two flange portions.

8. The latch device as claimed in claim 6, in which the guide grooves of the knob case are formed with slanted entrance parts for facilitating insertion of the projected portions of the knob into the guide grooves.

9. A latch device comprising:

a knob case adapted to be fixed to a lid that is pivotally connected a console box, said knob case having at least a pair of guide grooves, said guide grooves defining two parallel tracks and an insertion direction;

a manually operable knob that is able to pivot about an axis of rotation that is orthogonal to said insertion direction and relative to the knob case when properly inserted in the knob case, the knob having opposed projected portions, each projected portion positioned and sized to travel in said insertion direction so that said knob is moveable between at least first and second positions along a respective one of said tracks, the knob being equipped with a hook portion that is engageable with a catch portion provided by the console box when at said second position;

a coil-shaped torsion spring with first and second ends, the torsion spring being mounted on the knob in a direction transverse to said insertion direction and having the first end fixed to the knob and the second end pressed against a projection formed on the knob; and a stopper member tightly installed in the knob case, wherein when-the knob having the coil-shaped torsion spring mounted thereon and being connected to the knob case by having said stud portions inserted in said guide grooves, is at said second position, the second end of the torsion spring is in abutment with and pressed against the stopper member and is released from the projection of the knob, whereby, at the time when the knob is connected to the knob case at said second position, the torsion spring produces a given biasing force with which the knob is biased to pivot in a given direction.

10. A method of assembling the latch device as claimed in claim 1, comprising:

mounting the coil-shaped torsion spring on the pivotal member to constitute a pivotal member unit in such a manner that the first end thereof is fixed to the pivotal member and the second end thereof is pressed against the projection of the pivotal member;

moving the pivotal member unit toward the base member in such a manner that the second end of the torsion spring is brought into abutment with and pressed against the stopper member of the base member while releasing from the projection of the pivotal member; and continuing the movement of the pivotal member unit until the pivotal member unit is properly set to the base member.

* * * * *